(12) United States Patent
Pitzer

(10) Patent No.: US 8,794,188 B2
(45) Date of Patent: Aug. 5, 2014

(54) LIVESTOCK HOUSE SYSTEM AND METHODS OF QUASI-CONTINUOUSLY RAISING LIVESTOCK IN MULTIPLE PHASES

(75) Inventor: Andrew Kerner Pitzer, Fremont, NC (US)

(73) Assignee: Agriconic Design LLC, Goldsboro, NC (US)

( * ) Notice: Subject to any disclaimer, the term of this patent is extended or adjusted under 35 U.S.C. 154(b) by 267 days.

(21) Appl. No.: 13/081,739

(22) Filed: Apr. 7, 2011

(65) Prior Publication Data

US 2012/0255498 A1 Oct. 11, 2012

(51) Int. Cl.
*A01K 31/18* (2006.01)
*A01K 31/22* (2006.01)
*A01K 1/00* (2006.01)

(52) U.S. Cl.
CPC .............. *A01K 31/18* (2013.01); *A01K 31/22* (2013.01); *A01K 1/0041* (2013.01)
USPC .......................................... 119/437; 119/450

(58) Field of Classification Search
USPC ......... 119/436, 437, 438, 439, 440, 441, 442, 119/443, 444, 447, 450, 311, 314, 317, 319, 119/315
IPC ..................................... A01K 31/18,1/00, 41/00
See application file for complete search history.

(56) References Cited

U.S. PATENT DOCUMENTS

| | | | |
|---|---|---|---|
| 2,081,947 A * | 6/1937 | McCornack | 119/14.03 |
| 2,264,619 A | 12/1941 | Clayton | |
| 2,703,570 A * | 3/1955 | Young, Jr. | 600/19 |
| 3,261,324 A * | 7/1966 | Conover | 119/449 |
| 3,283,744 A * | 11/1966 | Conover | 119/449 |
| 3,396,703 A | 8/1968 | Trussell | |
| 3,633,547 A * | 1/1972 | Stevens et al. | 119/447 |
| 3,726,254 A * | 4/1973 | Conover | 119/445 |
| 3,903,851 A | 9/1975 | Van Huis | |
| 4,060,054 A * | 11/1977 | Blair | 119/447 |
| 4,316,552 A | 2/1982 | Hurley, III | |
| 4,369,030 A | 1/1983 | Siccardi | |
| 4,784,770 A | 11/1988 | Nagao | |
| 4,945,858 A | 8/1990 | Myers et al. | |
| 5,575,236 A * | 11/1996 | Pogue et al. | 119/6.5 |
| 5,657,720 A * | 8/1997 | Walters | 119/317 |

(Continued)

FOREIGN PATENT DOCUMENTS

GB 1306328 2/1973

OTHER PUBLICATIONS

International Patent Application No. PCT/US2012/032289: International Search Report and Written Opinion dated Aug. 10, 2012, 13 pages.

*Primary Examiner* — Shadi Baniani
(74) *Attorney, Agent, or Firm* — Baker & Hostetle LLP

(57) ABSTRACT

A multistage livestock house system may include an outer frame, and a plurality of adjacent stages within the outer frame. Each one of the stages may be configured to hold livestock of a predetermined age range for a predetermined time interval. The system may also include a wash system disposed in each stage, wherein at least one of the stages is configured to be washed by a respective wash system after each time interval. The system may also include an effluent tank that is configured to collect effluent that is washed from each stage by the wash systems.

20 Claims, 12 Drawing Sheets

(56) References Cited

U.S. PATENT DOCUMENTS

| | | |
|---|---|---|
| 5,695,647 A | 12/1997 | Carbonell et al. |
| 6,047,495 A | 4/2000 | Matsumura et al. |
| 6,810,832 B2 | 11/2004 | Ford |
| 6,953,266 B1 | 10/2005 | Ver Hage et al. |
| 7,674,311 B2 | 3/2010 | Gross et al. |
| 7,707,931 B2 | 5/2010 | Garrett et al. |
| 8,069,819 B2 * | 12/2011 | Huisinga et al. ............... 119/300 |
| 8,082,884 B2 * | 12/2011 | Sia ................................ 119/346 |
| 2007/0266957 A1 * | 11/2007 | Tozaka et al. ................. 119/437 |

* cited by examiner

LIVESTOCK HOUSE SYSTEM AND METHODS OF QUASI-CONTINUOUSLY RAISING LIVESTOCK IN MULTIPLE PHASES

BACKGROUND

Worldwide fifty billion chickens are produced annually for meat and egg consumption. Consumer demand drives ever increasing yield levels as producers try to manage and contain their overhead costs, lower pollution, and implement sustainable farming practices. Yet, the outcome of more intensive management using current poultry production applications places the birds under greater stress, decreasing their immune system and increasing the need for precautionary medications, antibiotics, and feed additives to prevent infectious outbreaks.

Currently, standard poultry production houses average 20,000 birds in a 400 ft. by 50 ft. building for approximately 57 days. (Industry standards require 0.8 sq. ft. of floor space per bird). Tunnel ventilation in these one story structures typically does not produce ventilation conducive to optimal air flow and even distribution of temperatures for birds in different areas of the structure. Adding to poor air flow is the lack of air quality due to buildup of gases, mold and microbes in the bed litter, and bird effluent covering the poultry house floor. The circulating air becomes harmful to the respiratory systems of not only the birds but the growers who tend them.

Traditional broiler chicken farming begins by taking eggs from laying houses and sending them to a large scale hatchery. The eggs are incubated at the hatchery for about 18 days. At about 21 days, the eggs will hatch. The chicks are then sexed, and checked for any birth defects and abnormalities. The healthy selected chicks are then transported at 1-2 days old to the broiler houses where they will live on average for 57 days. After 57 days the chickens will be considered full grown and/or reached the desired weight for slaughter and then may be collected and taken to a processing plant.

Before a new batch of chicks are brought into the house, the bed litter will be heated, aired out and cleaned to reduce the ammonia levels and CO2 levels. This can take a minimum of 7 days, therefore the chicken house may be out of operation for at least 6 weeks of the year. The bed litter will be used again for a number of chicken flocks where the chicks are exposed to higher levels of ammonia that can lead to respiratory diseases, and ammonia burns to skin and eyes which can lead to increases in mortality rates.

SUMMARY

A multistage livestock house system that is configured to house livestock that are in different stages of life is disclosed. The livestock house system includes an outer housing, an upper newborn portion positioned within the outer housing, a growing portion positioned within the outer housing and below the upper newborn portion, and a discharge portion at least partially positioned within the outer housing. The upper newborn portion may include a newborn stage configured to sustain newborn livestock. The growing portion may be configured to receive livestock from the upper newborn portion after the newborn livestock have aged a predetermined number of days. The growing portion may include a plurality of growing stages configured to sequentially sustain the livestock, each for a predetermined number of days. The discharge portion may be configured to receive livestock from the growing portion. The discharge portion may include a discharge stage that is configured to hold a group of mature livestock until the mature livestock are discharged for slaughter.

In another embodiment the multistage livestock house system may include an outer frame, and a plurality of adjacent stages within the outer frame. Each one of the stages may be configured to hold livestock of a predetermined age range for a predetermined time interval. The system may also include a wash system disposed in each stage, wherein at least one of the stages is configured to be washed by a respective wash system after each time interval. The system may also include an effluent tank that is configured to collect effluent that is washed from each stage by the wash systems.

Also disclosed is a quasi-continuous method of raising livestock in multiple phases. The method may include providing multiple, adjacent stages, each one of the stages configured to hold livestock of a predetermined age range for a predetermined time interval. Groups of livestock may be moved sequentially through the stages such that at or near the end of a time interval, the groups of livestock graduate to a next stage in the sequence until discharge when ready for slaughter, and a group of new, youngest livestock is introduced into the first stage. One of the stages may be selectively washed between movement of groups of livestock from one stage to the next. The effluent from the washing step may then be collected. The effluent may include excrement as a by-product.

BRIEF DESCRIPTION OF THE DRAWINGS

The foregoing summary, as well as the following detailed description of illustrative embodiments of the multistage livestock house system of the present application, will be better understood when read in conjunction with the appended drawings. For the purposes of illustrating the multistage livestock house system of the present application, there is shown in the drawings illustrative embodiments. It should be understood, however, that the application is not limited to the precise arrangements and methods described. In the drawings.

DETAILED DESCRIPTION

Figure 1:
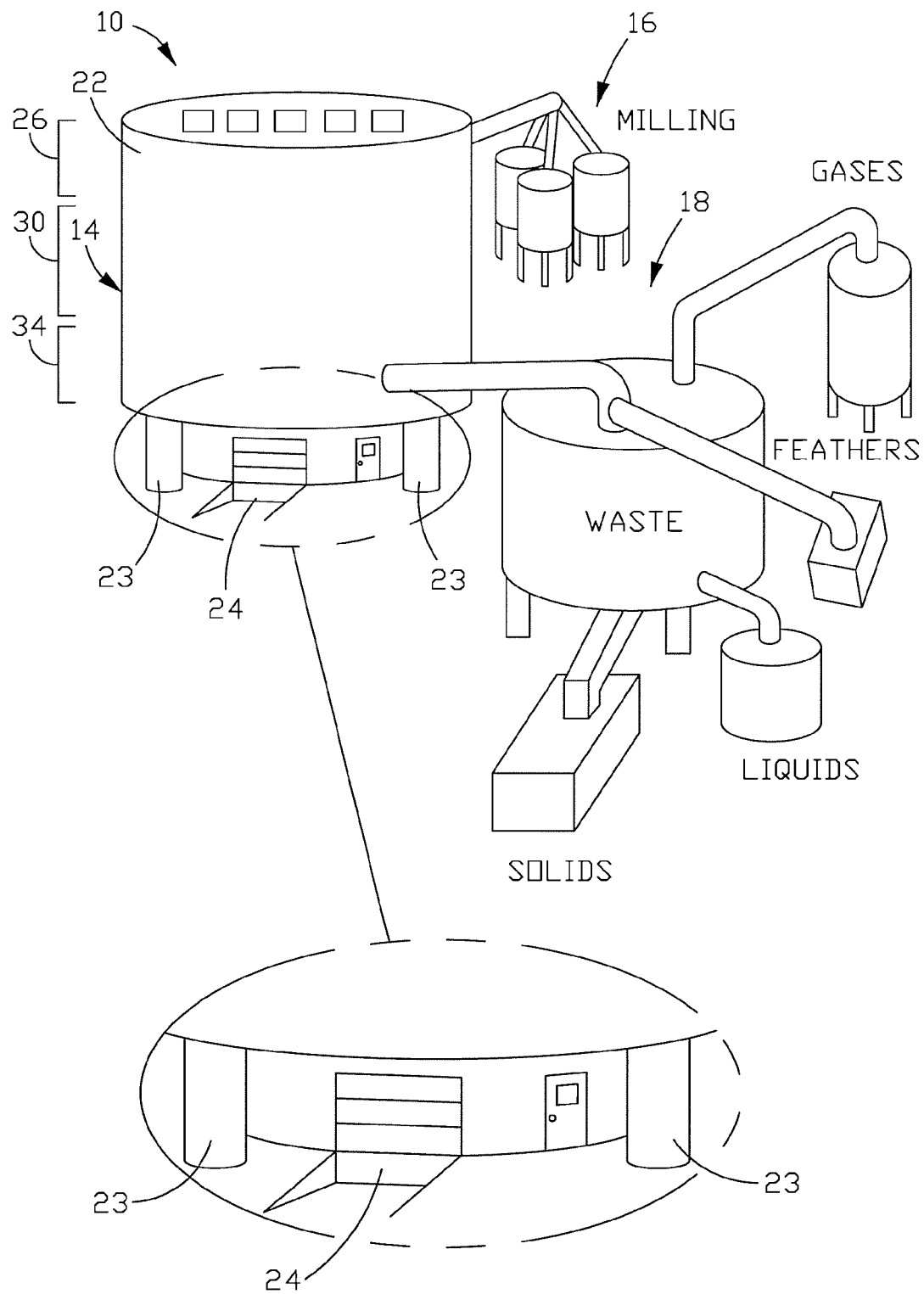
FIG. 1 is a schematic of a multistage livestock house system in accordance with an embodiment, the multistage livestock house system including a livestock house, a feed mill (i.e. a grain bin), and a waste treatment facility, each in communication with the livestock house.

In reference to FIG. 1, a multistage livestock house system 10 is configured to house and sustain livestock that are in different stages of life. In particular and as shown in FIGS. 1-4, the multistage livestock house system 10 includes multiple adjacent stages that are each configured to hold groups of livestock of a predetermined age range for a predetermined time interval. The groups of livestock are moved sequentially through the stages such that at or near the end of a time interval, the groups of livestock graduate to a next stage in the sequence until discharge when ready for slaughter. The livestock house system 10 may be designed such that the livestock are moved to adjacent stages without human interaction with the livestock, as will be described. As shown in FIG. 1, the multistage livestock house system 10 may include a livestock house 14, a feed mill 16, such as a grain bin, that is in communication with the livestock house 14, and a waste treatment facility 18 also in communication with the livestock house 14. The multistage livestock house system 10 illustrated in FIG. 1 is generally designed to house and raise poultry, such as broiler chickens. Though it should be understood that the multistage livestock house system 10 is not limited to housing and raising broiler chickens, and that the multistage livestock house system 10 may be designed to house and raise other types of chickens or even other types of livestock.

As shown in FIG. 1, the livestock house 14 includes an outer housing 22 and is generally configured to house and sustain groups of chickens that are in different phases of life. As shown, the outer housing 22 may be a cylindrical shaped building that is constructed out of steel and concrete and may be raised or otherwise supported on concrete pillars 23. It should be understood, however, that the outer housing 2 may include other configurations, for example, the outer walls of the outer housing 22 may be made from a cloth. The outer housing 22 may be large enough to house at least 40000 chickens at any given time. Therefore, the outer housing 22 may have a diameter of at least 120 ft to accommodate such a large quantity of chickens. While the illustrated embodiment of the livestock house 14 includes a cylindrical outer housing 22 and is sized to house at least 40000 chickens, it should be understood that the livestock house 14 may include other shapes, as desired, and may be configured to house any desired number of chickens at one time. For example, the livestock house 14 may include an outer housing 22 that is square shaped and may be sized to house at least 50000 chickens at one time.

A bottom of the outer housing 22 may include a loading dock 24 that is configured to receive unhatched eggs or baby chicks that are to be raised within the livestock house 14. The unhatched eggs or baby chicks may be provided by a dedicated clean truck that is loaded with trays of eggs from a hatchery or a hen laying house.

Within the outer housing 22 and in reference to FIGS. 1-4, the livestock house 14 may be separated into three general life phases of the chickens. For example, the livestock house 14 may include an upper newborn portion 26 positioned within and proximate to a top of the outer housing 22, a growing portion 30 positioned within the outer housing 22 and at least partially below the upper new born portion 26, and a discharge portion 34 positioned at least partially within the outer housing 22 and at least partially below the growing portion 30. The upper newborn portion 26, the growing portion 30, and the discharge portion 34, together include a plurality of adjacent stages 36 that are at least partially combined to define a helix such that each successive stage 36 is located lower than its adjacent, prior stage 36. As shown in FIG. 2, the adjacent stages 36 spiral around an inner core 38. It should be understood, however, that while the illustrated embodiment includes a plurality of adjacent stages 36 that define a helix, the adjacent stages 36 may be at least partially combined to define other configurations, as desired. For example, the adjacent stages 36 may be at least partially combined to define a stepped configuration that allows at least some of the stages 36 to be lower than an adjacent prior stage 36.

Figure 2A:
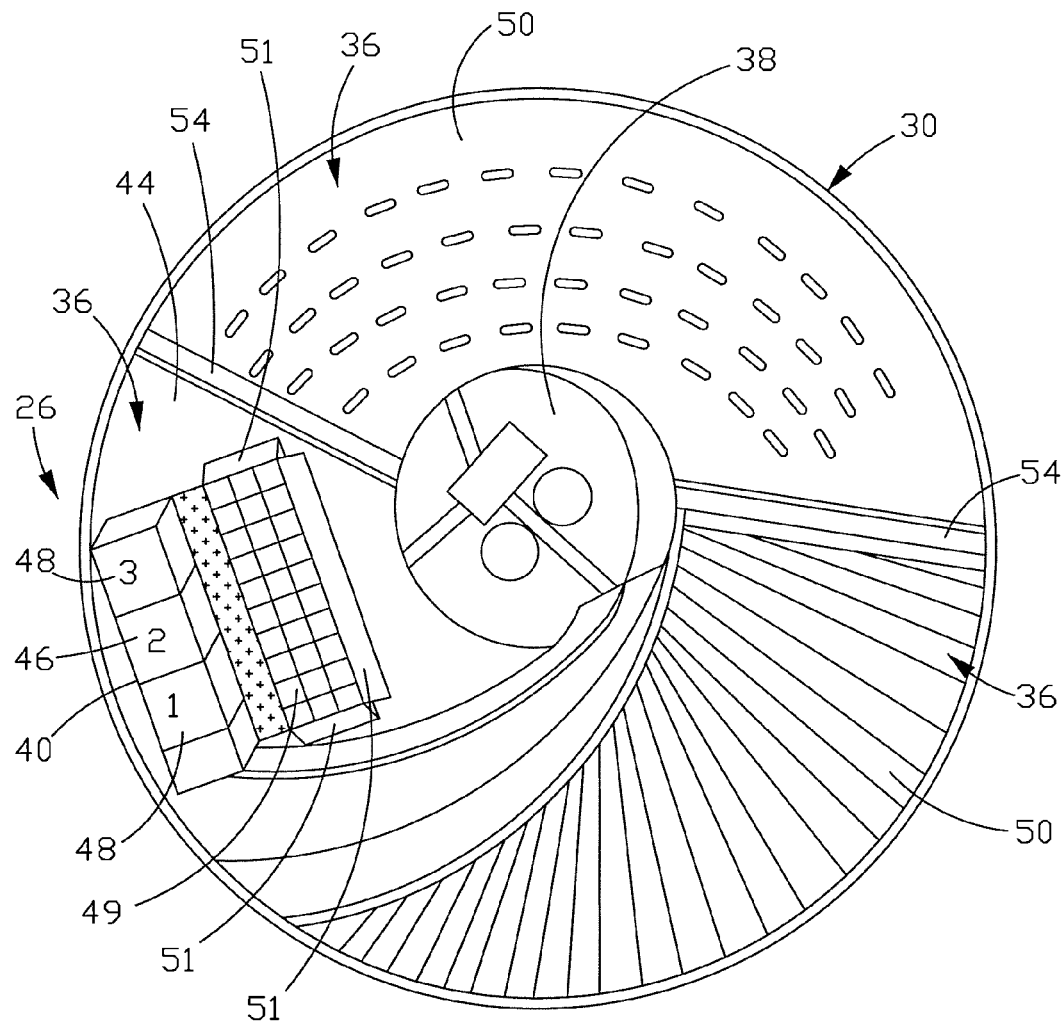
FIG. 2A is a top sectional view of the livestock house shown in FIG. 1, the livestock house including a plurality of adjacent stages that are arranged to have substantially helical orientation, each stage is configured to hold livestock of a predetermined age range for a predetermined time interval.
Figure 2B:
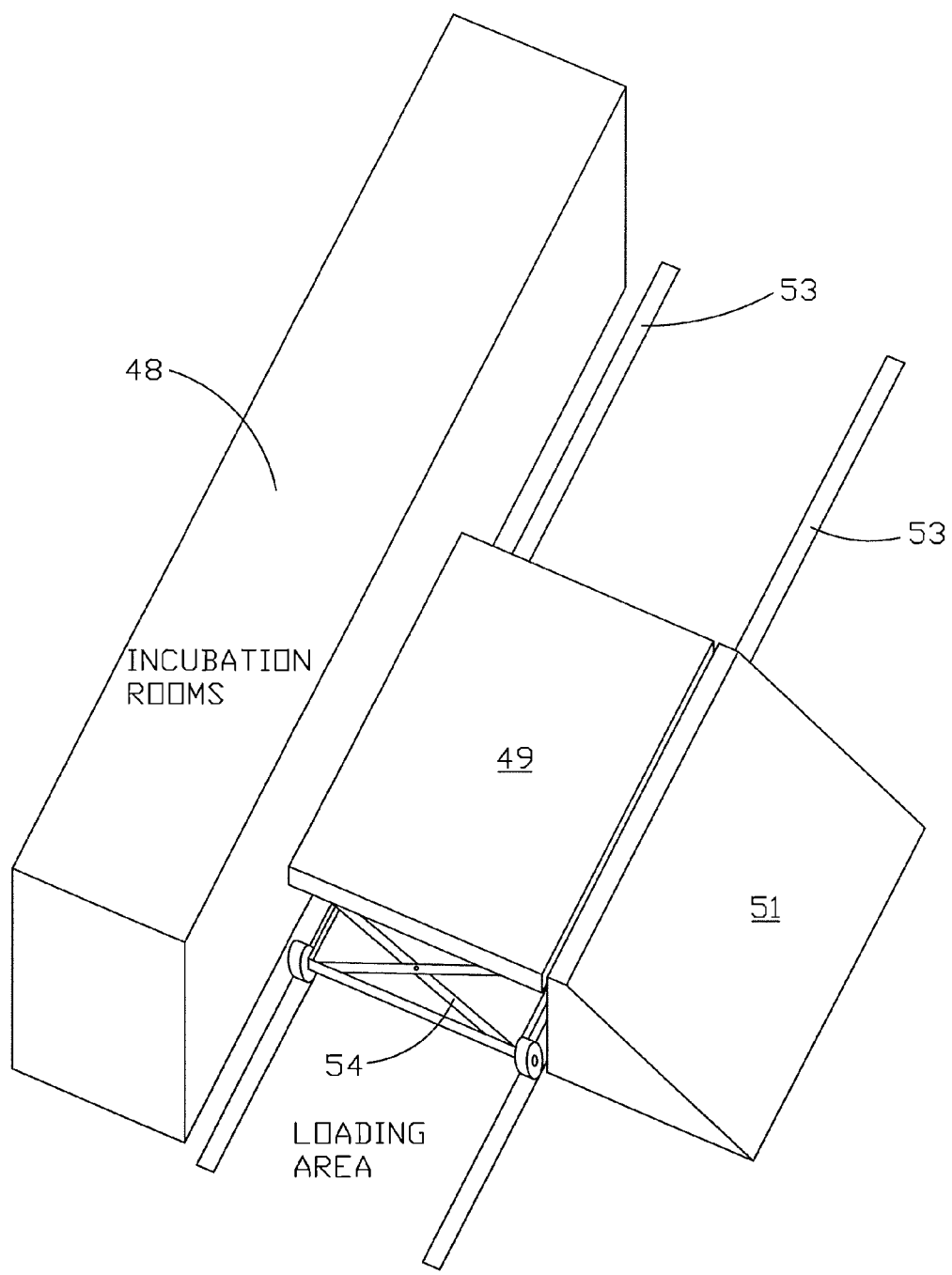
FIG. 2B is a top perspective view of a hatching table that may be used in a newborn stage of the livestock house shown in FIG. 2A.

As best shown in FIGS. 2A and 2B, the upper newborn portion 26 is positioned substantially near the top of the livestock house 14 and includes a hatchery 40 and a newborn stage 44 positioned adjacent the hatchery 40. The hatchery 40 includes at least one incubator 48 that is configured to warm about 15000 eggs for about 18 days or 19 days depending on the design. In one embodiment, the hatchery 40 includes at least three incubators 48, that are each configured to warm about 5000 eggs for about 18 days or 19 days. Once the eggs from at least one of the incubators 48 has been warmed for the desired amount of time, the eggs will be removed from the incubator 48 and moved to a hatching table 49 located in the newborn stage 44. In another embodiment, however, the eggs may stay in the incubators 48 for about 21 days, and when the chickens hatch, they will walk into the newborn stage 44 themselves.

While in the newborn stage 44, the chicks will wait until they are ready to be moved to a first growing stage 50 of the growing portion 30. The newborn stage 44 may be sized such that each newborn chick has about 0.4 ft$^2$ of living space. Therefore, if 5000 chicks are to be hatched in the newborn stage 44, the newborn stage 44 should be about 2000 ft$^2$. After about eight days in the newborn stage 44, the chicks may be moved to the first stage 50 of the growing portion 30.

As shown in FIG. 2A the hatching table 49 may be positioned proximate to the incubators 48 and may include at least one ramp 51, for example three ramps 51 as shown in FIG. 2A, that allow the chicks to walk out from the table 49 and down to the floor after they have hatched. The ramps 51 may have a corrugated shape and a similar feel to the rest of the flooring that is throughout the rest of the system 10. Moreover, the ramps 51 may have a gradual decline so that the chicks do not get injured. In another embodiment and in reference to FIG. 2B the hatching table 49 may be set on rails 52 for easy moveability. The trays may be slid down the rails 52 column by column until all trays needed are locked in place. As shown, the hatching table 49 may be set on a lift 53 that allows the table 49 to be lowered, lifted, or even angled in multiple direction. In the illustrated embodiment, the lift 53 is a hydrolic scissor lift.

The newborn stage 44 may not be brightly lit to reduce stress on the chicks. Once the chicks hatch and have had sufficient time to dry, the table 49 will be lowered or raised to meet the ramp 51 which will allow them to walk down to the floor without any or at least little aid from the grower. The hatching trays may include drop down sides to ease this process.

This will be the chicks first action, and from an animal behavior standpoint it sets a precedent that the chickens will learn from day one to walk through into the next phase of growth in the building until the final stage. Chicks will first analyze, process and memorise the movement and imprint as being ok to move forward towards the stimuli encouraging movement. Movement is induced down the ramp by encouraging lighting, temperature, flooring space and feed. Ultimately the birds will follow the first thing that moves—another chick—creating a family that moves together. By utilizing the natural behavior of the chickens, the chickens may be moved through the system 10 without or at least with minimal human intervention. That is, a grower may not have to actually be in any of the stages or phases with the chickens to get them to move to an adjacent stage.

The table 49 will then tilt in the opposite direction to remove the egg shells to be collected for other uses. Then the trays will move along the rails 52 to the cleaning area, and will be cleaned and sterilized ready for the next batch of eggs in 7 days time.

The loading dock close to the incubation rooms maybe half moon shaped similar to the building design and support the needs for the area to be washed. Waterproof materials may be used to reduce rusting and chemical erosion and excrement build up. The decline ramp can be a floor material similar to rest of phases but less grooves.

Figure 3:
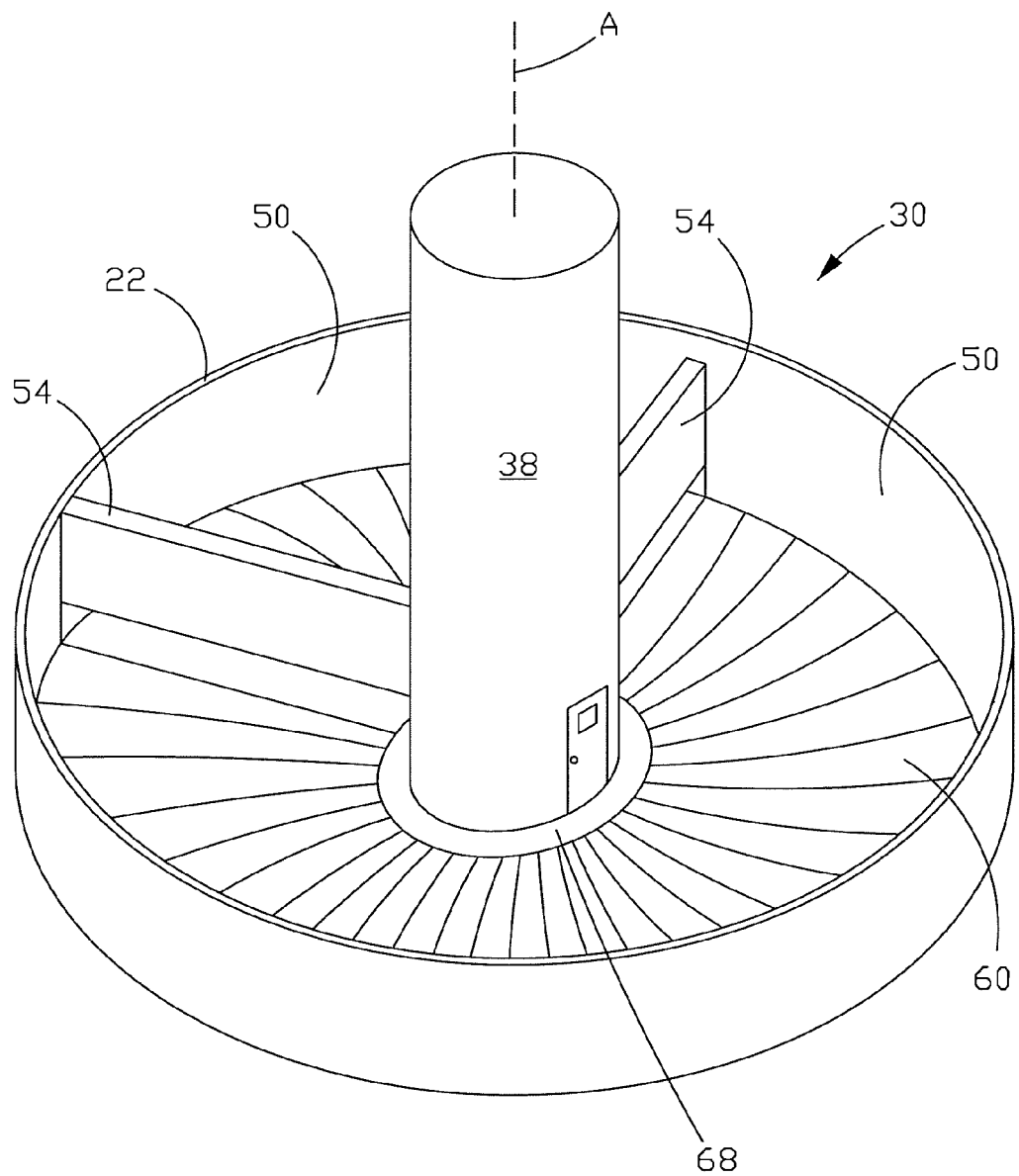
FIG. 3 is a partial perspective view of one of the plurality of adjacent stages of the livestock house shown in FIG. 1.

As shown in FIGS. 2A and 3, the growing portion 30 includes a plurality of adjacent growing stages 50 that generally define a substantial portion of the helix. In the illustrated embodiment, the growing portion 30 includes five growing stages 50 that are each configured to sustain the chickens for a predetermined number of days. Though it should be understood, that while the illustrated embodiment includes five growing stages 50, the growing portion 30 may include any number of growing stages 50, as desired. Generally, each stage 50 will sustain the groups of chickens for about eight days (or a different number of days as desired) before the chickens are moved to an adjacent subsequent stage 50. As shown in FIG. 3, each growing stage 50 is separated from an adjacent growing stage 50 by a door 54. When the chickens are to be moved from one stage 50 to a subsequent stage 50, the door 54 will be opened and a stimuli will be activated in the subsequent stage 50 to induce the chickens to move to the subsequent stage 50. For example, each growing stage 50 may include lighting controls that are configured to be selectively activated so as to induce the chickens to move toward the light and into the selected subsequent growing stage 50.

Because the chickens will grow in size as they are advanced through the growing stages 50, the growing stages 50 may gradually increase in size. That is, each one of the stages 50 may be sized according to the space requirements of the chickens housed in the individual stage 50, such that upper or beginning stages 50 are smaller in square feet of floor space than lower later stages 50. For example, the first growing stage 50 may be sized such that each chicken has at least 0.4 $ft^2$ of living space, the second and third growing stages may be sized such that each chicken has at least 0.6 $ft^2$ of living space, and the last two growing stages 50 may be sized such that each chicken has at least 0.8 $ft^2$ of living space. Therefore, if 5000 chicks are to be sustained in the growing stages 50, the first growing stage 50 should be at least 2000 $ft^2$, the second and third growing stages 50 should be at least 3000 $ft^2$, and the final two growing stages should be at least 4000 $ft^2$.

As best shown in FIG. 3, each growing stage 50 includes a floor 60 that angles down and radially inward toward a central axis A of the outer housing 22. The floors 60 may include corrugations that define grooves 64 (see, e.g. FIGS. 6 and 7) that are configured to collect effluent produced by the chickens while they are sustained within the stages 50. Moreover, the corrugations of the floor 60 may allow the chickens at least one of stand, sit, lie down, perch and/or any other position the chickens may desire on the floor 60 without being substantially in the effluent as they are sustained in the stages 50.

The floor 60 may be made of a plastic material, and the grooves 64 may each have a width from about 0.5 inches to about 5 inches. The depth of the grooves 64 may be sufficient to keep the waste collected after a seven day period at least ½ inch away from the chickens. In particular, the depth and width of the grooves 64 may be dimensioned to prevent the chickens from sitting in feces which would be unsanitary, and may cause tainted feathers and possible ammonia burns to the skin. The grooves 64 may also allow air to circulate below the chickens to prevent an unwanted heat, ammonia and CO2 build up.

Moreover, the grooves 64 may be designed to assist the natural genetic make up of the chickens foot, which has 16 small bones shaped to have toes known as phalanx allowing them to at least one of stand, sit, lie down, perch and/or any other position the chickens may be in. The plastic flooring 60 may be smooth or rough textured as an anti slip texture as desired. It should be understood that the flooring 60 may include features other than the corrugated grooves 64. For example, the grooved floor 60 may include slits where the effluent could drop into a pan beneath for ease of flushing. Moreover, the flooring 60 may be comprised of existing plastic lattice interlocking flooring available for poultry with a pan underneath that would flow into the flush system.

It should be understood that dirt may be placed on the flooring 60 in desired places. For example, dirt may be placed in a location where the chickens enter a new stage to help induce movement into the stage. In another embodiment, dirt boxes may be placed at strategic points in each stage. The dirt would allow the chickens to have a growing environment that allows them to behave naturally. For example, the chickens will then be able to peck at dirt or have a dry dust bath.

As shown in FIG. 3, the grooved floors 60 angle into a waste collection gutter 68. As shown, the waste collection gutter 68 extends proximate to a radially inward side of the floors 60. The waste collection gutter 68 may extend through each stage 36 of the system 10 and into the waste treatment facility 18. At the very least, the collection gutter 68 extends through each growing stage 50 of the growing portion 30. When the stages are to be washed, the effluent will be forced into the collection gutter 68 where it will be directed to the waste treatment facility 18 to be processed. Because the floors 60 are angled toward the gutter 68, the effluent will naturally flow into the gutter 68 when the floors 60 are washed.

Figure 4:
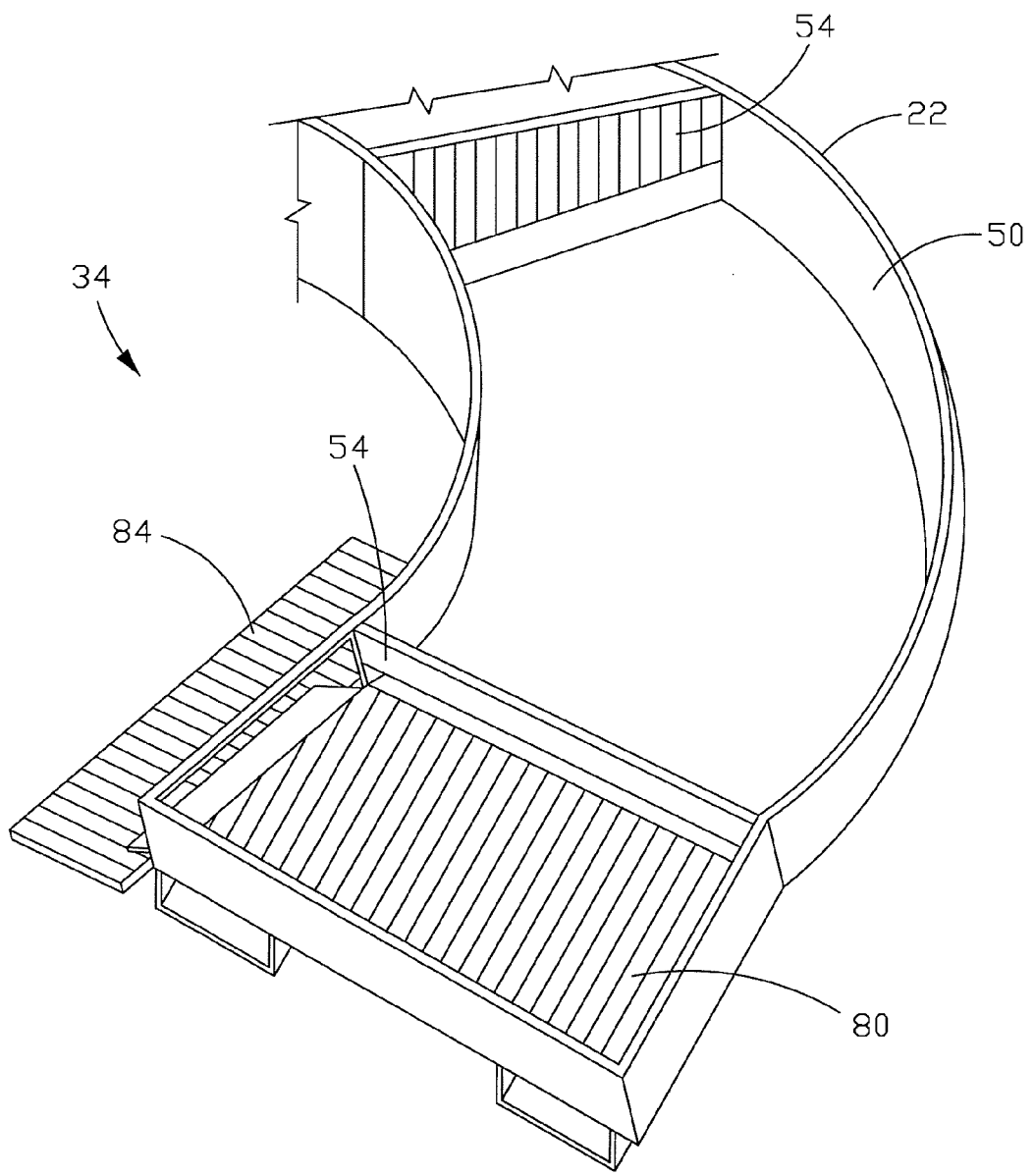
FIG. 4 is a partial perspective view of the final stage of the livestock house shown in FIG. 1, the final stage configured to collect the livestock and prepare them for slaughter.

As shown in FIG. 4, the discharge portion 34 is positioned at least partially within the outer housing 22 and in communication with the last growing stage 50 of the growing portion 30. As shown, the discharge portion 34 includes a discharge stage 80 that is configured to receive the chickens from the growing portion 30, and is configured to hold the chickens until they are discharged for slaughter. The discharge portion 34 further includes a conveyor 84 that is adjacent the discharge stage 80. When the chickens are ready to be discharged, $CO_2$ gas will be pumped into the discharge stage 80, to thereby euthanize the chickens in a pain free manner. Once Euthanized the chickens may be moved onto the conveyor 84. It should be understood, however, that the discharge portion 34 may include configurations other than a conveyor and $CO_2$ gas to discharge and/or euthanize the chickens. For example, the chickens may be captured and crated to be brought to a processing plant for slaughter.

Figure 5:
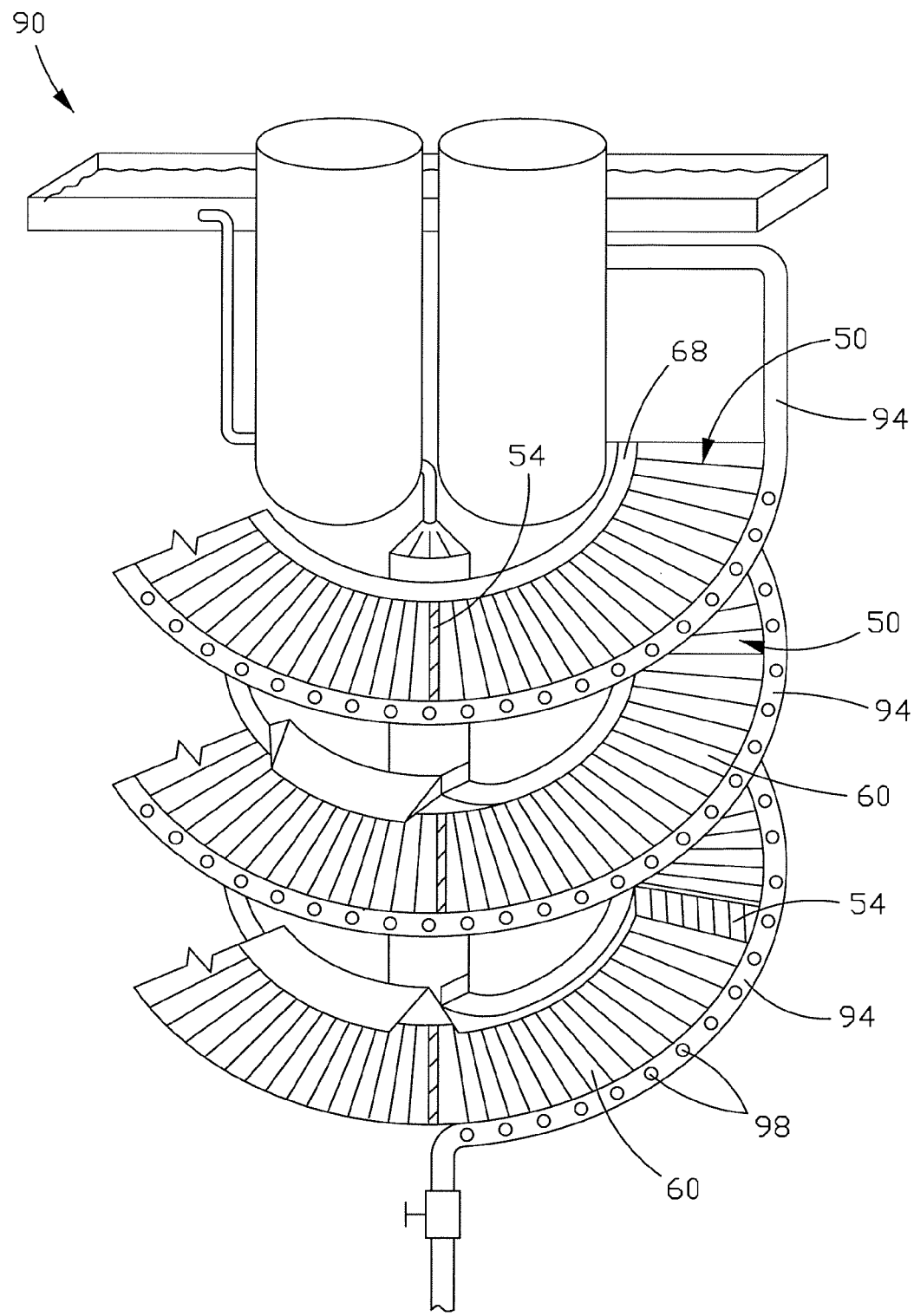
FIG. 5 is a front perspective view of a wash system configured to selectively wash each stage of the plurality of stages of the livestock house.

As shown in FIG. 5, the livestock house system 10 may include a wash system 90 that is configured to selectively wash at least each stage 50 of the growing portion 30. As shown, the wash system 90 includes a pipe 94 that extends through each stage 50 proximate to a radially outward side of the floors 60. Therefore, the pipe 94 and the waste collection gutter 68 extend along opposed sides of the stage floors 60. As shown, the pipe 94 includes a plurality of nozzles 98 that extend from the pipe toward or at least parallel to the floors 60. In particular, each individual stage 50 includes several nozzles 98 that are configured to wash or otherwise flush their respective floors 60. In use, when a group of chickens are moved from a stage 50 to a subsequent stage 50, the nozzles 98 of the emptied stage 50 may be opened, or otherwise activated to thereby wash the effluent produced by the chickens into the waste collection gutter 68. The waste collection gutter 68 will then direct the effluent to the waste treatment facility 18 for processing. It should be understood, that the wash system 90 may be configured to wash each stage of the system and not just the growing stages 50. Therefore, the pipe 94 may extend through each stage of the newborn portion 26, each stage of the growing portion 30, and each stage of the discharge portion 34, so as to allow each stage of the system 10 to be selectively washed.

Figure 6:
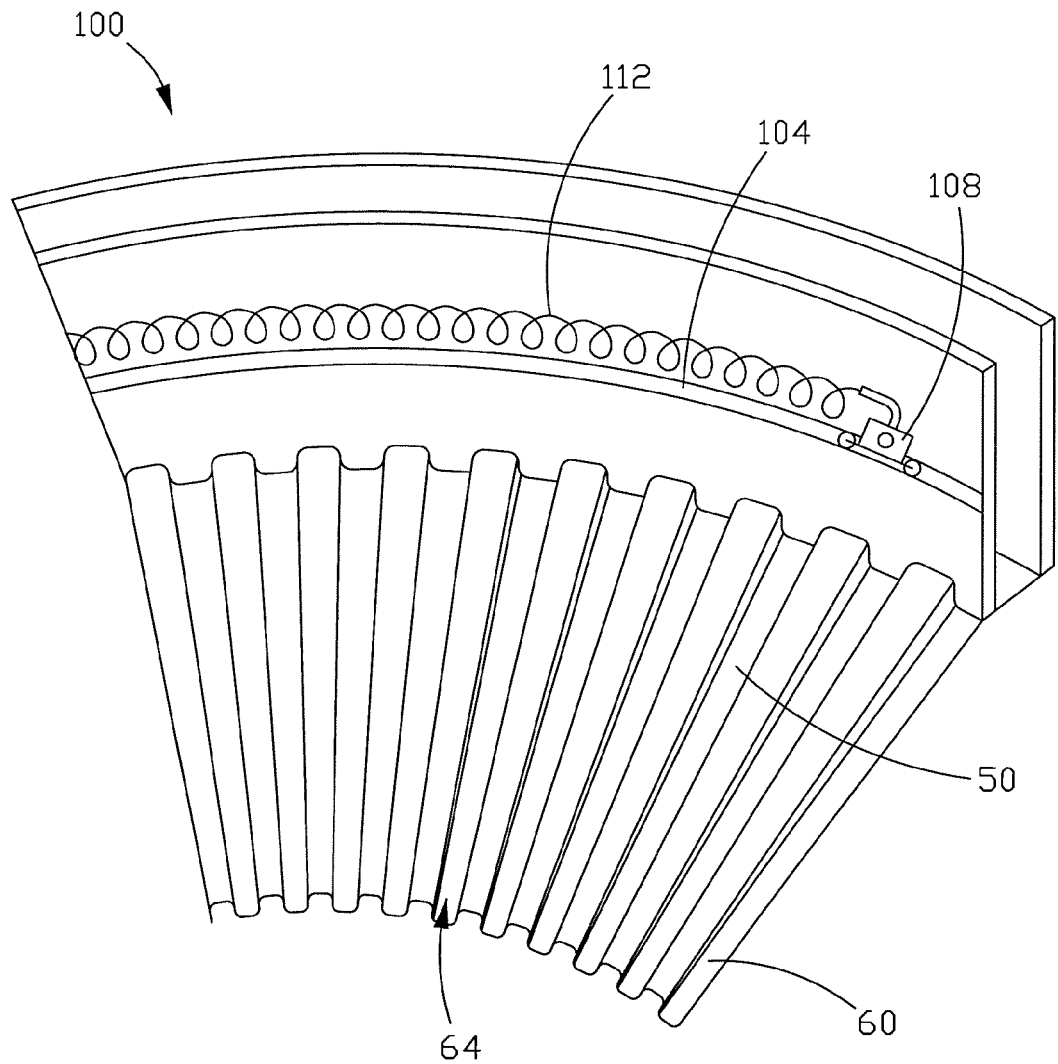
FIG. 6 is front perspective view of a wash system in accordance with another embodiment, the wash system including a movable nozzle that is capable of translating along a track to each stage of the plurality of stages to thereby selectively wash each stage as desired.

In another embodiment and in reference to FIG. 6, the livestock house system 10 may include a wash system 100 having a track 104 and a nozzle 108 that rides or otherwise translates along the track to each stage 50. As shown, the track 104 may extend through each stage 50 proximate to a radially outward side of the floors 60. Therefore, the track 104 and gutter 68 are on opposed sides of the floors 60. The nozzle 108 is connected to a hose 112 that will supply water to the nozzle 108. In use, when a group of chickens are moved from a stage 50 to a subsequent stage, the nozzle 108 may be translated to the emptied stage 50 and opened or otherwise activated to thereby wash the effluent produced by the chickens into the waste collection gutter 68. The hose 112 should have length that would allow the nozzle 108 to translate to each stage 50. Therefore, in such an embodiment, only one nozzle 108 may be needed as opposed to a plurality of nozzles as with wash system 90. It should be understood, that the wash system 100 may be configured to wash each stage of the system and not just the growing stages 50. Therefore, the track 104 may extend through each stage of the newborn portion 26, each stage of the growing portion 30, and each stage of the discharge portion 34, so as to allow each stage of the system 10 to be selectively washed.

Figure 7:
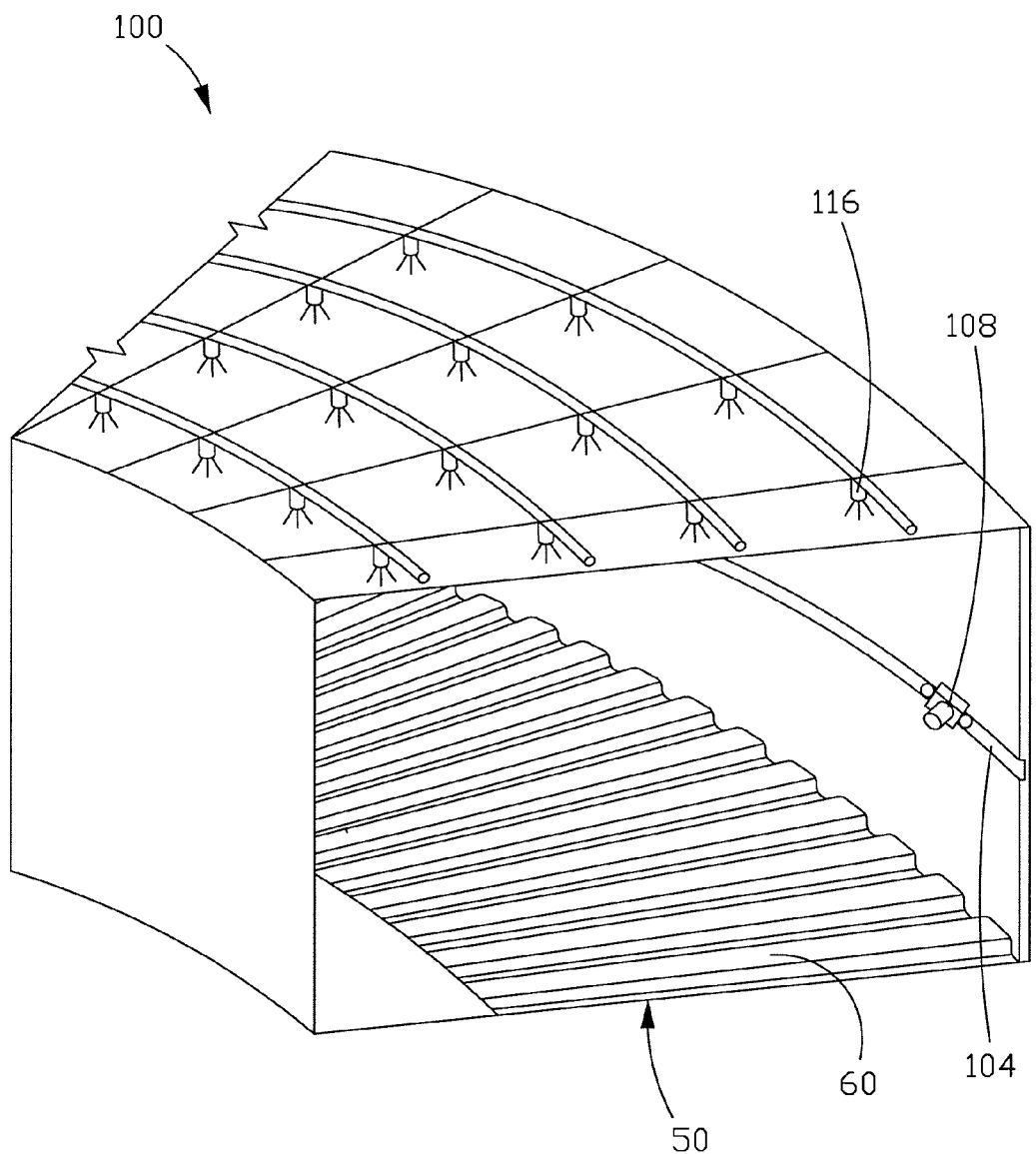
FIG. 7 is a front perspective view of a wash system in accordance with another embodiment, the wash system including a fogger that is configured to provide a water mist.

As shown in FIG. 7, the wash systems 90 and 100 may also include a plurality of foggers 116 positioned above the floors 60 of each stage 50. The foggers 116 are configured to provide a water jet and or steam that is directed toward the floors 60 from a position that is above the floors 60. The foggers 116 may be used to spray a thin film of water that may or may not contain a cleaning agent to dislodge the effluent and waste on the floor 60 prior to the main wash by the nozzles 98 or 108.

Figure 8:
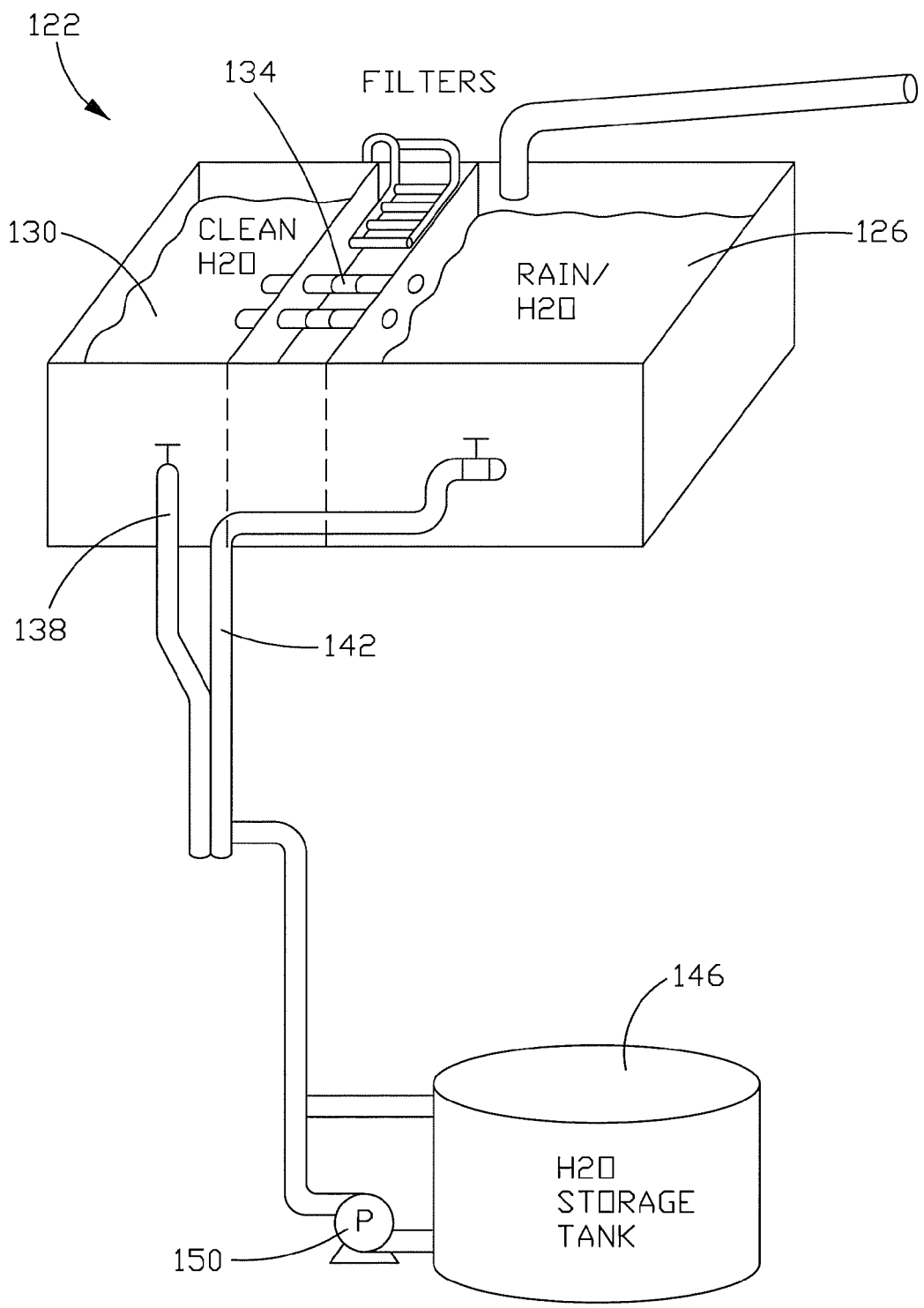
FIG. 8 is a schematic illustrating a water collection and holding system of the multistage livestock house system, the water collection and holding system configured to collect rain water to be used for the wash system, and other uses.

As shown in FIG. 8, the wash systems 90 and 100 may be supplied with water from a water collection and holding system 122. In particular, the water collection and holding system 122 may be configured to collect and filter rain water to thereby at least partially supply the system 10 with drinking water, and water for cleaning the floors 60. As shown, the water collection system 122 includes a rain collection tank 126 and a filtered water tank 130 that is separated from the rain collection tank 126 by a filter 134. Some of the water collected and stored within the rain collection tank 126 may be passed through the filter 134 and into the filtered water tank 130.

As shown in FIG. 8, the water collection system 122 may include a pipe system 138 that extends from the filtered water tank 130 and into each of the stages of the system 10. Water from the filtered water tank 130 may then be supplied to each of the stages for the chickens to drink. Similarly, the water collection system 122 may include a pipe system 142 that extends from the rain collection tank 126 and into the wash system 90 (or 100). Water from the rain collection tank 126 may therefore be used by the wash system 90 to flush the effluent from the floors 60 and into the waste collection gutter 68. Water from the rain collection tank 126 may also be directed to cooling cells to thereby cool certain stages of the system 10.

As shown in FIG. 8, the water collection and holding system 122 may also include an external storage tank 146 that is configured to hold and store excess water collected by the rain collection tank 126. If water is needed from the external storage tank 146, a pump 150 may be activated to pump the water from the tank 146 to the portion of the system 10 in need of water.

Figure 9:
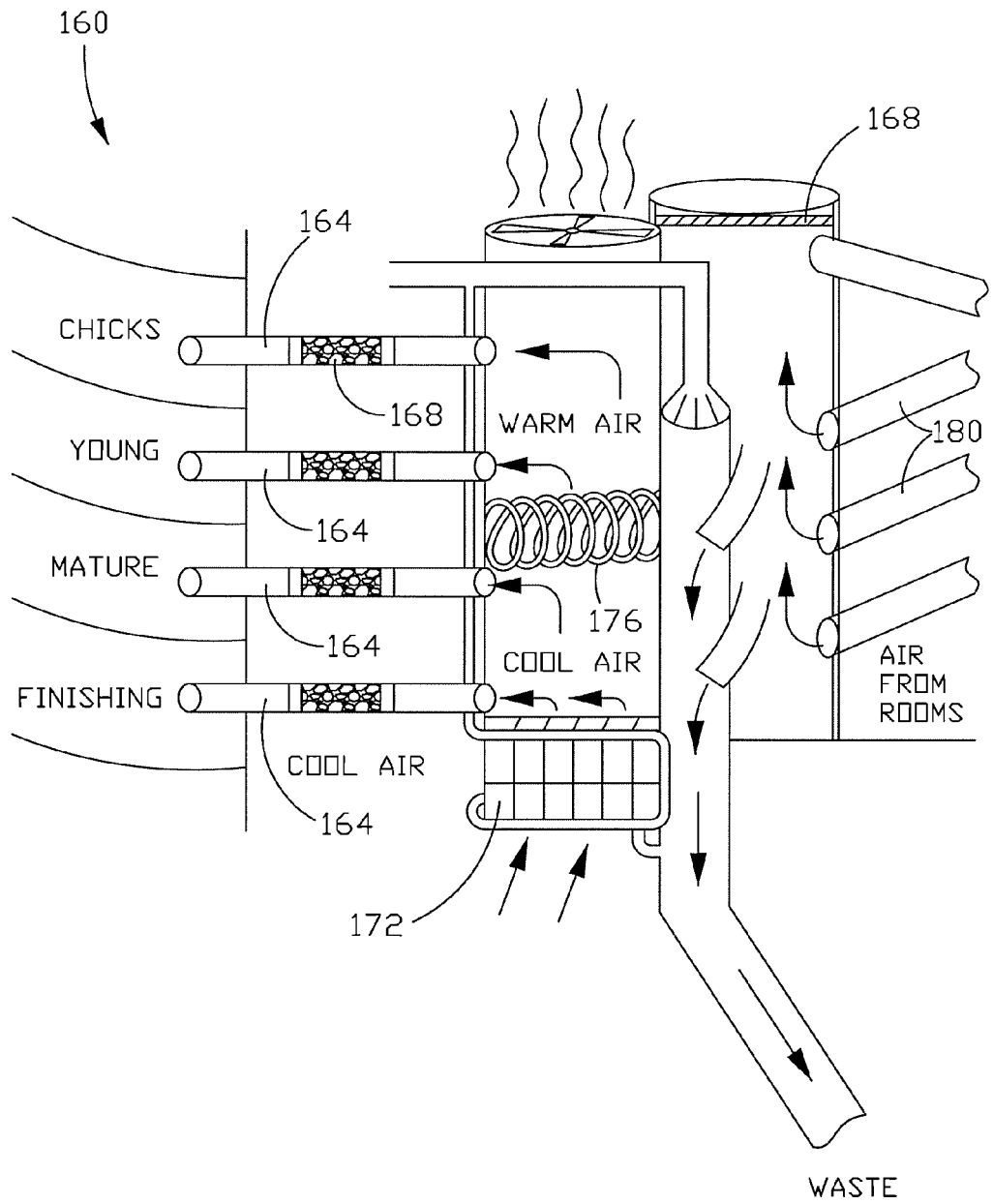
FIG. 9 is a schematic illustrating a ventilation system of the multistage livestock house system, the ventilation system configured to pump heat produced by larger chickens in the later stages to the chicks of the earlier stages of the multistage livestock house system.

As shown in FIG. 9, the livestock house system 10 may also include a ventilation system 160 that is configured to either cool or heat the individual stages of the system 10 (depending on the age of the chickens). Typically, the chicks and younger chickens need warm air pumped into their stages, while the mature and full grown chickens require cool air to keep them comfortable and lower their stress levels. As shown, the ventilation system 160 includes piping 164 that extends into each stage of the system 10. The pipes 164 going into each stage include a filter 168 to ensure that the air going into each stage is clean. Furthermore, each stage of the system 10 should be substantially sealed from an adjacent stage to thereby allow individual climate control within the stages.

As shown, the ventilation system 160 may include cool cells 172 to provide cool air to the later growing stages 50 of the growing portion 30 and to the stages of the discharge portion 34. The cool air will keep the mature and full grown chickens comfortable and substantially stress free in the later stages of their lives.

As shown, the ventilation system 160 may also include heating coils 176 to provide warm air to the earlier growing stages 50 of the growing portion 30, and to the newborn portion 26. Moreover, the larger mature and full grown chickens that are sustained in the lower stages of the system 10 produce large amounts of body heat that may be used to supply warm air to the upper stages of the system 10 that contain the incubators 48 and/or sustain the younger or newborn chicks. Therefore, the ventilation system 160 may also include piping 180 that is configured to capture the body heat generated by the chickens sustained in the later stages and circulate it to the newborn portion 26, and to the earlier stages of the growing portion 30. The ventilation system 160 therefore saves energy costs by allowing for natural convection of air warmed by the mature chickens body heat to thereby capture otherwise wasted energy.

Figure 10:
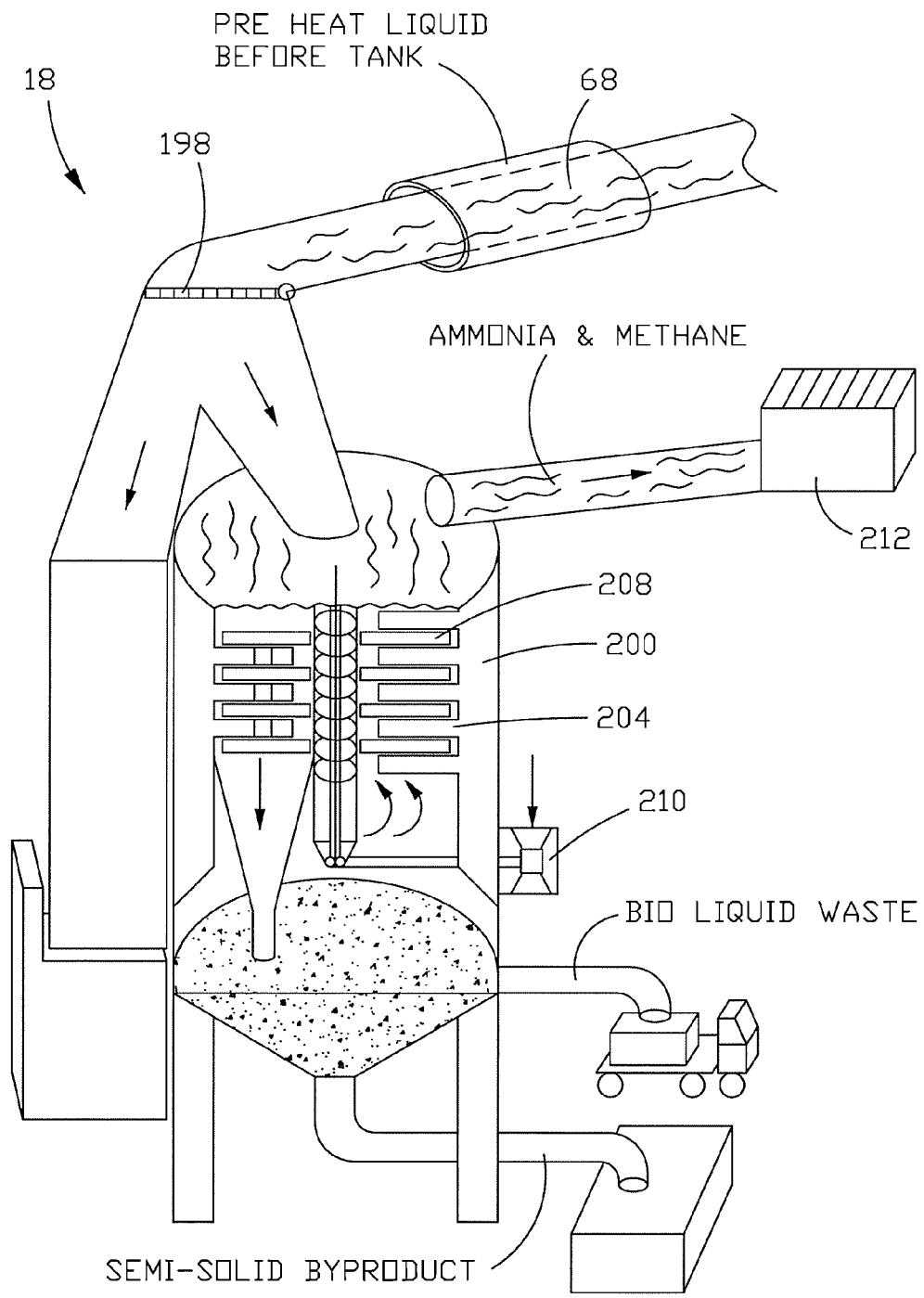
FIG. 10 is a schematic illustrating the waste treatment facility of the multistage livestock house system, the waste treatment facility configured to collect methane and nitrates produced by the livestock effluent that is washed out by the wash system.

Now referring to FIG. 10, the waste treatment facility 18 is in communication with the waste collection gutter 68 such that effluent captured from the stages 50 is directed to the waste treatment facility 18 for processing. As shown, the facility 18 includes a heater 197, a strainer 198, and an effluent tank 200 that is configured to collect the effluent. Prior to entering the tank 200, the effluent passes through the heater 197 and is heated to a desired temperature, and then is passed through the strainer 198 which captures or otherwise separates feathers and other unwanted materials from the effluent. While the strained/heated effluent will pass through the strainer 198 and into the tank 200, the feathers may be redirected to a separate compartment for other uses.

As shown, the tank 200 includes a processor 204 having several blades 208 that are rotated by a motor 210. As the effluent enters the tank 200, the effluent passes through the blades 208 and gets mixed together or otherwise turned into a slurry. Different additives (i.e. microbes, bacteria, or other catalysts) are added to the effluent which induces the effluent to produce methane, ammonia, and possibly other gases. The ammonia and methane produced by the effluent will rise, may be separated, and then separately captured or otherwise contained within a gas tank 212. These captured gases may then be utilized for other purposes. For example, the methane may be used as an alternative energy source for the system 10, or may be packaged and sold to be used by others.

The effluent in the tank 200 includes primarily excrement from the chickens and should be substantially free of bedding or other materials. Such effluent may then be turned into a semi-solid byproduct that can be refined for other applications, and also into a bio-liquid that contains nitrogen. Because the system 10, and in particular the waste treatment facility 18 is able to efficiently collect and isolate the excrement from the chickens, the byproducts from the excrement (i.e. methane gas, ammonia gas, nitrate fertilizer, and urea) maybe easily reused by the system 10 or may be sold to others for profit. For example, a combination of urea and ammonia nitrate may be dissolved in water to form a highly soluble liquid fertilizer, typically containing 28 or 32 parts nitrogen. Nitrogen solutions are used almost exclusively as nitrogen fertilizer materials. It should be understood, that the flush system may automatically turn the urea and ammonia nitrate into a soluble liquid fertilizer.

In operation, the livestock house system 10 is capable of quasi-continuously raising chickens in multiple phases of life. Initially, eggs may be supplied from a reliable hatchery or from a hen laying house and delivered to the loading dock 24 at the bottom of the house 14. The eggs may be cleaned in a clean room that is near the loading dock 24 and then subsequently moved to the incubators 48 in the hatchery 40. Once the eggs have been in the incubators 48 for about 18 or 19 days they are moved to hatching tables 49 that are located in the newborn stage 44. After the chickens hatch from the eggs they will remain in the newborn stage 44 until they are ready to be moved to the first growing stage 50 of the growing portion 30. As soon as the chickens hatch, the incubators 48 may be cleaned and then refilled with fresh eggs. By having three incubators 48, each with a group of eggs at different stages in the process, the system 10 will quasi-continuously be supplied with new chicks to be raised. That is, every 7 days a new group of chicks will hatch and be moved into the growing portion 30.

While in the growing portion 30, the chickens will move into a new growing stage 50 about every 8 days. Therefore, after 8 days within the first growing stage 50, the door 54 separating the first growing stage 50 from the second growing stage 50 will open. By turning a light on in the second growing stage 50 the chickens will be enticed to leave the first growing stage and move into the second growing stage. At this point, the door 54 will be closed and the first growing stage will be washed by the wash system 90. After the stage 50 is washed (typically about one day), a new group of chickens may be moved into the first growing stage 50. Once the system 10 is fully operational, each stage 50 gets cleaned after about 8 days.

Typically, the system 10 will have 5 growing stages 50. The chickens will pass through each stage 50 and will be sustained within each stage for about 8 days. After the growing portion 30, the chickens will pass into the discharge stage 80 of the discharge portion 34. The chickens will be sustained in the discharge stage 80 where they will be prepared for slaughter. After a desired amount of days has passed the chickens will be euthanized and moved onto the conveyor 84. Such a system allows chickens to be raised in a relatively stress free environment with minimal human interaction.

Figure 11:
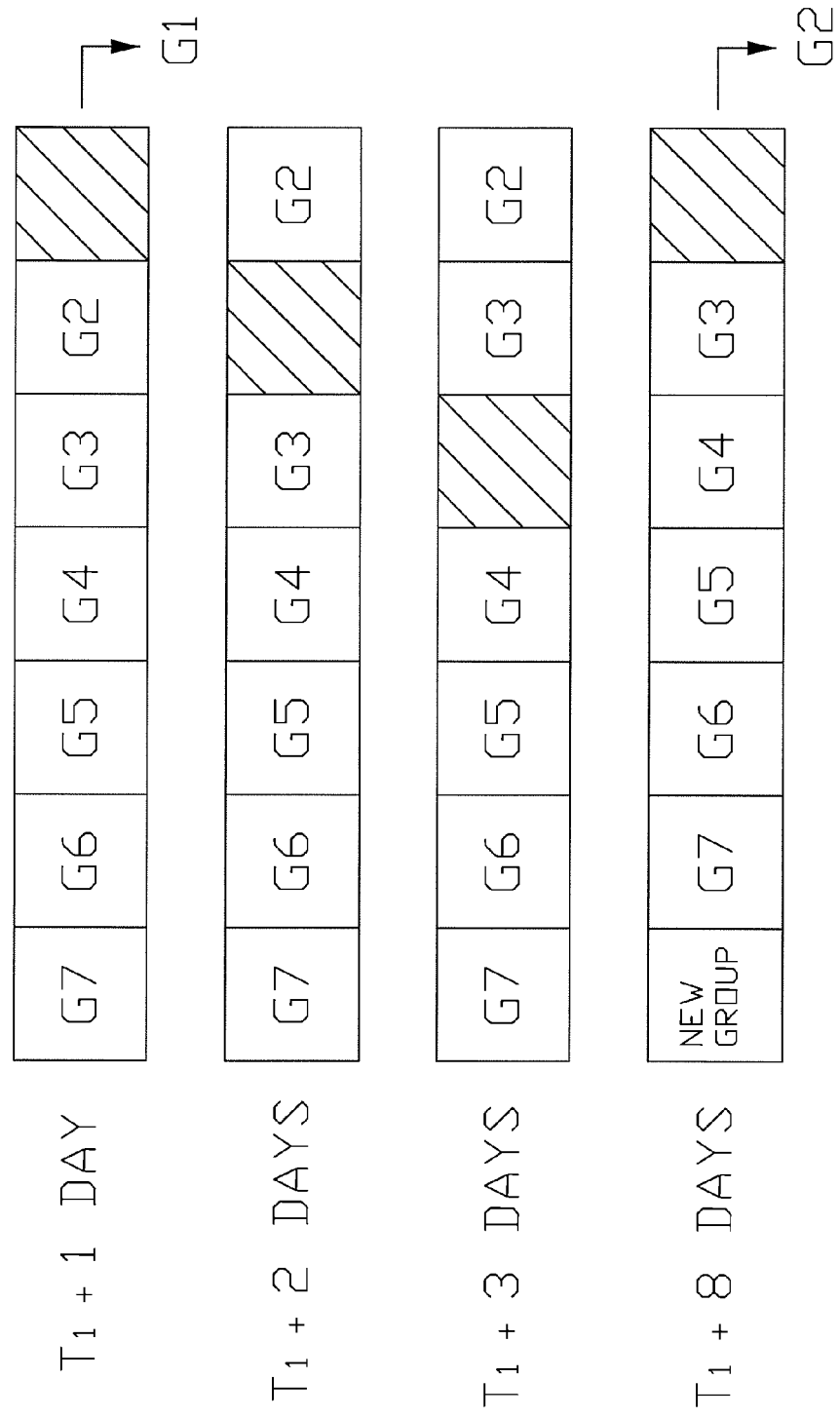
FIG. 11 is a schematic illustrating the operation and wash cycles of the multistage livestock house system.

As shown in FIG. 11, once the system 10 is fully operational, all but one of the stages of the system 10 will be occupied by a group of chickens that are in a particular phase of their lives. As shown in the example, once the Group 1 of chickens has been discharged for slaughter, the emptied stage may be cleaned. After one day of cleaning, a Group 2 of chickens may be moved into the discharge stage, and the newly emptied growing stage may be cleaned. This process continues, and after 8 days, the Group 2 chickens will be discharged for slaughter, and the discharge stage will be cleaned again. Each time a group of chickens are discharged for slaughter, a new group of chickens will be moved into the system. Such a system allows for the chickens to be raised in an environment that is much cleaner than prior systems. Moreover, because the system 10 collects and captures the effluent produced by the chickens, the effluent may be used to produce additional profit or energy for the system 10.

The foregoing description is provided for the purpose of explanation and is not to be construed as limiting the invention. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the invention is not intended to be limited to the particulars disclosed herein. Moreover, any of the embodiments described above can incorporate any structures or features of any of the other embodiments described above, as desired. Those skilled in the relevant art, having the benefit of the teachings of this specification, may effect numerous modifications to the invention as described herein, and changes may be made without departing from the spirit and scope of the invention as defined by the appended claims.

What is claimed:

1. A multistage chicken house system configured to house chickens that are in different stages of life, the chicken house system comprising:

an outer housing;

an upper newborn portion positioned within the outer housing, the upper newborn portion including a newborn stage, the newborn stage sustains newborn chickens;

a growing portion positioned within the outer housing and below the upper newborn portion, the growing portion receives chickens from the upper newborn portion after the newborn chickens have aged a predetermined number of days, the growing portion including a plurality of growing stages sequentially sustain the chickens, each for a predetermined number of days, wherein the plurality of growing stages of the growing portion are oriented in a helix such that a first one of the stages is located at a top level and each successive stage is located lower than its adjacent, prior stage, and wherein each growing stage is separated from an adjacent growing stage by a respective openable door such that the chickens move from one growing stage and directly into a successive growing stage through the respective openable door; and a discharge portion at least partially positioned within the outer housing and below at least one of the growing stages, the discharge portion receives chickens from the growing portion, the discharge portion including a discharge stage, discharge stage holds a group of mature chickens until the mature chickens are discharged for slaughter.

2. The system of claim 1, wherein each one of the stages is sized according to the requirements of the chickens of the predetermined age range housed in the stage, such that upper stages are smaller in square feet of floor space than lower stages.

3. The system of claim 1, further comprising a ventilation system that is configured to circulate body heat generated from the stages of the more mature chickens to the stages of the less mature chickens.

4. The system of claim 1, wherein the stages are substantially sealed from one another by the plurality of doors, thereby enabling individual climate control.

5. The system of claim 1, wherein at least the growing stages have a grooved floor that drains to an effluent tank.

6. The system of claim 5, wherein each growing stage includes an isolated water wash system that is configured to force effluent disposed on the grooved floor into the effluent tank.

7. The system of claim 6, further comprising a strainer that is configured to strain the effluent of feathers before entering the effluent tank.

8. The system of claim 6, wherein the effluent tank is configured to capture methane produced by the effluent contained within the tank.

9. The system of claim 6, wherein the effluent washed into the effluent tank includes nitrogen liquid fertilizer as a by-product.

10. The system of claim 1, wherein (i) the upper newborn portion further includes an incubator configured to hold eggs, and (ii) the newborn stage is configured to receive hatched chicks from the eggs held by the incubator.

11. The system of claim 1, wherein each growing stage includes individual lighting controls.

12. A multistage chicken house system configured to house chickens that are in different stages of life, the chicken house system comprising:

an outer frame;

an upper newborn portion positioned within the outer frame, the upper newborn portion including a newborn stage, the newborn stage sustains newborn chickens;

a growing portion positioned within the outer frame and below the upper newborn portion, the growing portion receives chickens from the upper newborn portion after the newborn chickens have aged a predetermined number of days, the growing portion including a plurality of growing stages sequentially sustain the chickens, each for a predetermined number of days, wherein the plurality of growing stages of the growing portion are oriented in a helix such that a first one of the stages is located at a top level and each successive stage is located lower than its adjacent, prior stage, and wherein each growing stage is separated from an adjacent growing stage by a respective openable door such that the chickens move from one growing stage and directly into a successive growing stage through the respective openable door; and a discharge portion at least partially positioned within the outer frame and below at least one of the growing stages, the discharge portion receives chickens from the growing portion, the discharge portion including a discharge stage, the discharge stage holds a group of mature chickens until the mature chickens are discharged for slaughter;

a wash system, wherein at least one of the stages is configured to be washed by the wash system after each time interval; and an effluent tank that is configured to collect effluent that is washed from each stage by the wash system.

13. The system of claim 12, wherein each one of the stages is sized according to the requirements of the chickens of the predetermined age range housed in the stage, such that upper stages are smaller in square feet of floor space than lower stages.

14. The system of claim 12, further comprising a ventilation system that is configured to circulate body heat generated from the stages of the more mature chickens to the stages of the less mature chickens.

15. The system of claim 12, wherein the stages are substantially sealed from one another, thereby enabling individual climate control.

16. The system of claim 12, wherein at least some of the stages have a grooved floor that drains to the effluent tank.

17. The system of claim 12, further comprising a strainer that is configured to strain the effluent of feathers before entering the effluent tank.

18. The system of claim 12, wherein the effluent tank is configured to capture methane produced by the effluent contained within the tank.

19. The system of claim 12, wherein each stage includes individual lighting controls.

20. The system of claim 12, wherein the effluent contained within the effluent tank includes nitrogen liquid fertilizer as a by-product.

* * * * *